US008493176B2

(12) United States Patent
Fukumoto

(10) Patent No.: US 8,493,176 B2
(45) Date of Patent: Jul. 23, 2013

(54) IMAGE DATA MANAGEMENT SYSTEM

(75) Inventor: Tetsuo Fukumoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1018 days.

(21) Appl. No.: 12/156,073

(22) Filed: May 28, 2008

(65) Prior Publication Data

US 2008/0301192 A1 Dec. 4, 2008

(30) Foreign Application Priority Data

May 29, 2007 (JP) ................................ 2007-141843

(51) Int. Cl.
*G05B 19/00* (2006.01)
*G06F 7/04* (2006.01)

(52) U.S. Cl.
USPC ............... 340/5.7; 340/5.2; 340/5.3; 340/5.8; 340/5.81; 726/2; 726/26

(58) Field of Classification Search
USPC ................. 340/5.3, 5.7, 5.81, 5.31, 5.61, 5.2, 340/5.8; 705/2, 5; 400/106, 105, 104; 726/2, 726/26
See application file for complete search history.

(56) References Cited

U.S. PATENT DOCUMENTS 7,331,725 B2 * 2/2008 Troyansky et al. ........... 400/106
2005/0021370 A1 * 1/2005 Riff et al. .......................... 705/2
2005/0168766 A1 * 8/2005 Troyansky et al. .......... 358/1.14

FOREIGN PATENT DOCUMENTS

| | | |
|---|---|---|
| CN | 1845136 A | 10/2006 |
| JP | 2004-110690 | 4/2004 |
| JP | 2006-268549 | 10/2006 |
| JP | 2007-322947 | 12/2007 |

* cited by examiner

*Primary Examiner* — Hai Phan
*Assistant Examiner* — Peter Mehravari
(74) *Attorney, Agent, or Firm* — Edwards Wildman Palmer LLP; David G. Conlin; Stephen D. LeBarron

(57) ABSTRACT

There is provided an image data management system that restricts a user's exit depending on the use of image data containing confidential information. An image data management system includes a management server 1, printers 2, gates 3 and 4, and an IC card 6. The printers 2 generate processing information when the user processes the image data, and store the processing information in the IC card 6. When the user is going to exit a managed area A or B, the gate 3 reads user information and the processing information from the IC card 6. The management server 1 determines whether feature information is present in the processing information. If feature information is present, the user's exit is prohibited. A manager's PC 5 is informed of the prohibition.

11 Claims, 8 Drawing Sheets

FIG. 4

| USER ID | PASSWORD | FEATURE POINT SAMPLE |
|---|---|---|
| 001 | abcx | COMPANY CONFIDENTIAL ×○○MEETING REPORT 、○××. jpg |
| 002 | bfx0 | COMPANY CONFIDENTIAL DEPARTMENT CONFIDENTIAL······. |
| 003 | ···· | |
| | | |

FIG. 5

| USER ID | AVAILABLE ROOM | PASSWORD | FEATURE POINT SAMPLE |
|---|---|---|---|
| 001 | A、B | abcx | |
| 002 | B | bfx0 | |
| 003 | B | ···· | |
| | | | |

FIG. 6

| SECURITY ROOM | FEATURE POINT SAMPLE |
|---|---|
| A | COMPANY CONFIDENTIAL, DEPARTMENT CONFIDENTIAL |
| B | COMPANY CONFIDENTIAL ××× DATA 、×○○ MEETING REPORT |
| | |

IMAGE DATA MANAGEMENT SYSTEM

BACKGROUND OF THE INVENTION

1. Field of the Invention

The present invention relates to an image data management system that manages carrying image data outside.

2. Description of the Related Art

In an image data management system in which an image processing apparatus and a management server are connected over a network, image data output is managed in order to prevent leakage of confidential information. For example, as described in Japanese Patent Laid-Open No. 2004-110690, a magnetic tag is attached to a recording sheet having image data recorded thereon. When a user passes through a gate of a managed area, the magnetic tag on the recording sheet is detected to check whether the user is allowed to carry the recording sheet outside. In this manner, recording sheets having confidential information recorded thereon can be freely read within the managed area while prevented from being illicitly carried outside.

Thus, the Japanese Patent Laid-Open No. 2004-110690 can restrain carrying a recording sheet with a magnetic tag outside. However, if, for example, the recording sheet is copied on a sheet without a magnetic tag using a copier placed in the managed area, carrying the recording sheet outside cannot be restrained.

In view of the above, it is an object of the present invention to provide an image data management system that restricts a user's exit by knowing the state of use of image data.

SUMMARY OF THE INVENTION

To achieve the above object, the present invention is characterized by including: a monitoring apparatus that monitors a user's exit from a managed area; an image processing apparatus provided in the managed area; and a storage apparatus that stores processing information when the user uses the image processing apparatus to process image data, wherein the monitoring apparatus refers to the processing information in the storage apparatus to determine whether the user's exit from the managed area is permitted or prohibited.

Whenever the user processes image data, the image processing apparatus stores information about the processing, i.e., the processing information, in the storage apparatus. Here, the processing information is information about the user who has instructed the processing, the type of the mode in which the image processing apparatus has performed the processing under the user's instruction, and so on. Specifically, the processing information includes: user information identifying the user who has instructed the processing; feature information contained in the processed image data; expiration date information indicating the period for which the processed image data is kept confidential; area information about the managed area in which the image processing apparatus is placed; and mode information about the mode in which the image processing apparatus has performed the processing under the user's instruction.

When the user is going to exit the managed area, the monitoring apparatus determines whether the user's exit from the managed area is permitted or prohibited based on the processing information stored in the storage apparatus. Therefore, if image data for internal use only is outputted onto a medium other than a specifically designed recording sheet, the user's exit can be restricted based on the processing information. This can prevent confidential image data from being carried outside and restrain leakage of the image data.

The monitoring apparatus determines whether or not the user's exit is permitted based on one or more of the processing information items. For example, in the case where the determination is made based on the user information, the monitoring apparatus identifies the user from the user information. The monitoring apparatus determines whether or not the identified user can use the image processing apparatus to process the image data. If it is determined that the user can use the image processing apparatus, the user's exit is permitted. If it is determined that the user cannot use the image processing apparatus, the user's exit is prohibited.

In the case where the determination is made based on the feature information, the monitoring apparatus extracts feature information contained in the image data and determines whether or not the image data is confidential from the extracted feature information. If it is determined that the image data is not confidential, the user's exit is permitted. If it is determined that the image data is confidential, the user's exit is prohibited.

In the case where the determination is made based on the expiration date information, the monitoring apparatus checks whether or not the expiration date has passed from the expiration date information. The monitoring apparatus determines whether the image data must be kept confidential or may be disclosed. If it is determined that the image data may be disclosed, the user's exit is permitted. If it is determined that the image data must be kept confidential, the user's exit is prohibited.

The expiration date information may be set for the user information, feature information, area information, and so on. In this manner, the respective information items can be set to be valid for a certain period. According to this configuration, the monitoring apparatus checks the validity of each information item based on the expiration date information for that information item and determines whether or not the user's exit is permitted based on the result of checking.

In the case where the determination is made based on the area information, the monitoring apparatus determines whether or not the processed image data can be carried outside the managed area from the area information. If it is determined that the image data can be carried outside, the user's exit is permitted. If it is determined that the image data cannot be carried outside, the user's exit is prohibited.

In the case where the determination is made based on the mode information, the monitoring apparatus identifies details of the processing from the mode information and determines whether or not the user's use of the processing is authorized. If it is determined that the use is authorized, the user's exit is permitted. If it is determined that the use is unauthorized, the user's exit is prohibited.

According to the above configuration, the monitoring apparatus can restrain leakage of image data containing confidential information that should not be carried outside based on the state of use indicating what kind of processing has been performed by the user for what kind of image data.

The present invention is characterized in that the storage apparatus is a portable storage medium, the image processing apparatus includes a writing section that writes the processing information onto the storage medium, and the monitoring apparatus includes a reading section that reads the processing information from the storage medium when the user is going to exit the managed area.

Here, the portable storage medium may be a writable and readable storage medium, such as an IC card with an IC tag or IC chip embedded therein, a magnetic card capable of writing and reading with external magnetism, USB memory that is memory itself, or a mobile phone.

The monitoring apparatus reads the processing information from the storage medium carried by the user when the user is going to exit the managed area. Depending on the read processing information, the monitoring apparatus determines whether the user's exit from the managed area is permitted or prohibited.

As a specific aspect, the monitoring apparatus includes a management section that controls the opening and closing of a gate provided at a doorway of the managed area, and the management section can communicate with the reading section. According to this configuration, the management section determines whether the user's exit from the managed area is permitted or prohibited upon receiving the processing information from the reading section. Depending on the determination result, the management section controls the opening and closing of the gate.

As another aspect, the monitoring apparatus includes a management section that controls the opening and closing of a gate provided at a doorway of the managed area, and the management section includes the reading section. According to this configuration, the management section determines whether the user's exit from the managed area is permitted or prohibited based on the processing information from the reading section upon detecting the user going to exit the managed area. Depending on the determination result, the management section controls the opening and closing of the gate.

The present invention is characterized by including a management server connected with the monitoring apparatus and the image processing apparatus over a network, wherein the management server is the storage apparatus, the image processing apparatus writes the processing information into the management server, and the monitoring apparatus obtains the processing information from the management server when the user is going to exit the managed area.

The monitoring apparatus reads the processing information from the management server connected over the network. Depending on the read processing information, the monitoring apparatus determines whether the user's exit from the managed area is permitted or prohibited.

As a specific aspect, the management server functions as the monitoring apparatus. The management server includes a management section that controls the opening and closing of a gate provided at a doorway of the managed area. According to this configuration, the management section determines whether the user's exit from the managed area is permitted or prohibited based on the processing information upon detecting the user going to exit the managed area. Depending on the determination result, the management section controls the opening and closing of the gate.

As another aspect, the monitoring apparatus includes a management section that controls the opening and closing of a gate provided at a doorway of the managed area. According to this configuration, upon detecting the user going to exit the managed area, the management section obtains the processing information from the management server and determines whether the user's exit from the managed area is permitted or prohibited. Depending on the determination result, the management section controls the opening and closing of the gate.

The present invention is characterized by including a plurality of managed areas, wherein the plurality of managed areas form a multiple structure in which inner managed areas are included in outer managed areas, and the monitoring apparatus determines whether the user's exit from each managed area is permitted or prohibited each time the user is going to exit the managed area.

The monitoring apparatus checks whether or not the user's exit from a managed area is permitted each time the user is going to exit the managed area. For example, each time the user is going to exit a managed area, the monitoring apparatus performs comparison with reference information that is set for each managed area, thereby determining whether the exit from the managed area is permitted or prohibited.

As a specific aspect, among the existing managed areas, the monitoring apparatus varies conditions for determining the prohibition of the exit. That is, conditions for comparison exist for each managed area that the user is going to exit. Therefore, the monitoring apparatus can determine whether or not the user's exit is permitted depending on the state of use in each managed area.

As another aspect, since outer managed areas are closer to the outside, the monitoring apparatus sets stricter conditions for determining whether the user's exit is permitted or prohibited for outer managed areas. For example, as the user is going to exit a managed area closer to the outside, the monitoring apparatus requires more information for determining the prohibition of the exit. That is, as the managed area to exit is closer to the outside, more conditions for comparison are required. Thus, if the various conditions are not met, the monitoring apparatus prohibits the exit and the user cannot go outside.

The present invention is characterized in that the monitoring apparatus notifies a manager when it is determined that the exit is prohibited. According to this configuration, the monitoring apparatus can promptly inform the manager if, for example, the user is going to carry confidential image data outside.

BRIEF DESCRIPTION OF THE DRAWINGS

FIG. 4 is a diagram showing a data table of feature information defined for each user;

FIG. 5 is a diagram showing a data table of managed areas defined for each user;

FIG. 6 is a diagram showing a data table of feature information defined for each managed area;

DETAILED DESCRIPTION OF THE PREFERRED EMBODIMENTS

First Embodiment

An image data management system in this embodiment includes a monitoring apparatus for monitoring a user's exit from managed areas A and B, a plurality of image processing apparatuses placed in the managed areas A and B, and a storage apparatus for storing processing information about image data when the user uses the image processing apparatuses.

Figure 1:
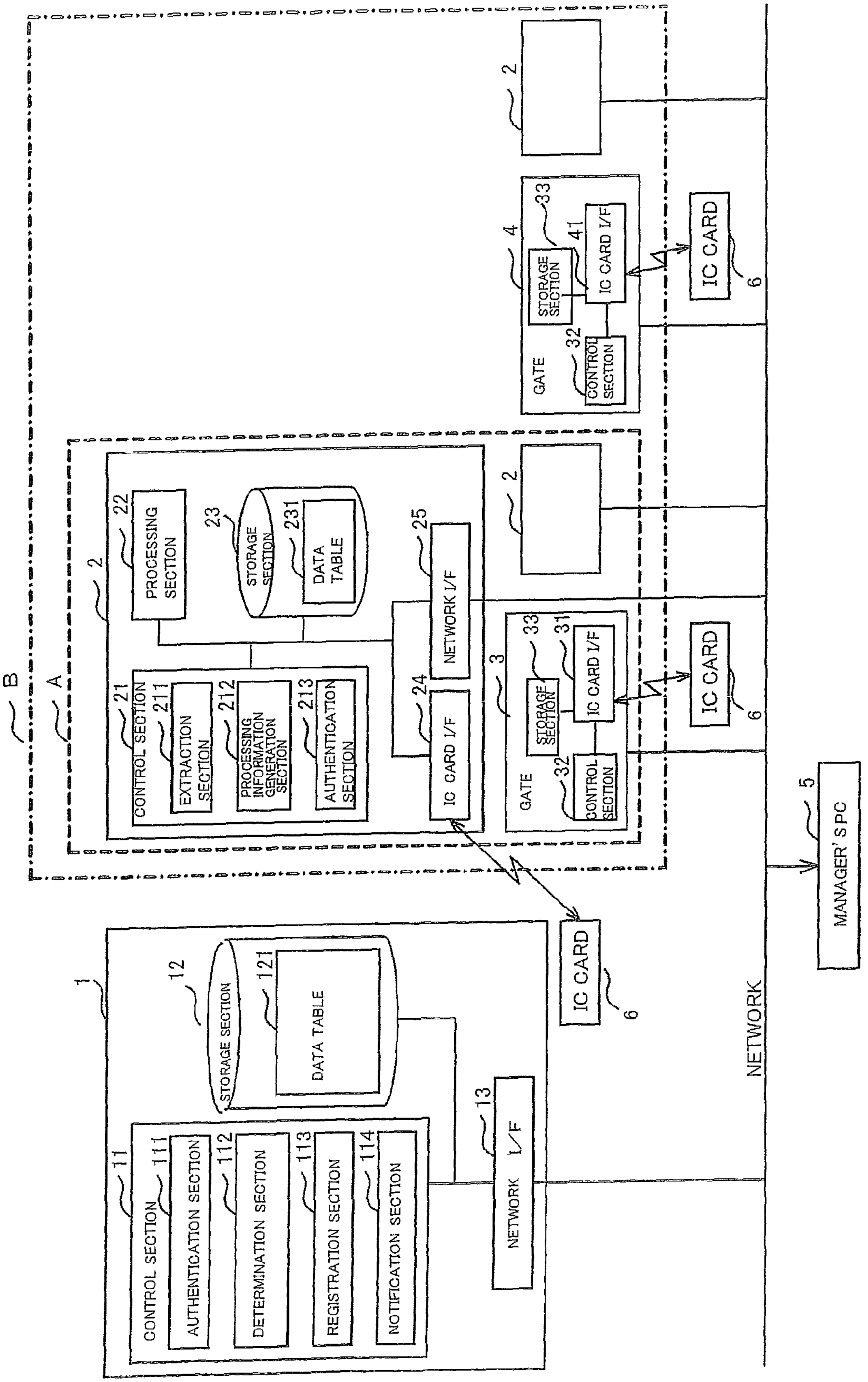
FIG. 1 is a block diagram of an image data management system according to a first embodiment.

Specifically, as shown in FIG. 1, the management system mainly comprises a management server 1, printers 2 serving as the image processing apparatuses, gates 3 and 4 provided at the doorway of the managed areas A and B respectively, a manager's PC 5 used by a manager of the management system, and an IC card 6 serving as the storage apparatus. The management server 1 serves as the monitoring apparatus.

The management server 1, the printers 2, and the gates 3 and 4 each have a network I/F 13 or 25. The respective apparatuses are connected to a network such as a LAN, WAN, or the Internet via their network I/F 13 or 25. This allows data transmission and reception among the apparatuses over the network.

Each of the managed areas A and B is a defined area having a doorway through which the user enters and exits the area. A plurality of managed areas A and B form a multiple structure. That is, the inner managed area A is included within the outer managed area B. The structure shown in FIG. 1 is a double structure. For example, the outer managed area B is a floor, and the inner managed area A is a document storage room.

The manager's PC 5 is a terminal apparatus, such as a personal computer, used by the manager who manages this management system.

The IC card 6 is a contact or contactless card with an IC tag, memory, and so on embedded therein. The IC card 6 is carried by its user. User information for identifying the carrying user is stored in the user's IC card 6.

The printers 2 are multifunction peripherals capable of copying, facsimile communication, scanning, data communication, and so on. The printers 2 are placed in the managed areas A and B, respectively. Each printer 2 includes a processing section 22 for performing various kinds of processing under the user's instructions, a storage section 23 implemented as a hard disk apparatus, an IC card I/F 24 for transmitting and receives data to and from the IC card 6, the network I/F 25 to which the network is connected, and a control section 21 responsible for controlling these sections.

The processing section 22 has a reading function for sequentially reading images of set documents one by one, an image processing function for processing the read images in a desired manner, an image conversion function for converting the read images into image data, and a print function for printing the converted image data on recording sheets.

The storage section 23 stores a data table 231 in which conditions for comparison are registered for extracting feature information such as a text string, picture, drawing, or photograph from the image data. The storage section 23 also stores a program for controlling each section.

The control section 21 performs specified processing for the image data. That is, in response to an input from the user, or in response to a data input from an external apparatus, the control section 21 performs any of a copy mode, print mode, scanner mode, facsimile mode, document filing mode, and data transmission mode for the image data. By controlling each section based on the program stored in the storage section 23, the control section 21 processes the image data to cause the image data to be output in a desired form.

The control section 21 includes an extraction section 211 that determines whether feature information is contained in the image data to be processed and extracts the feature information, a processing information generation section 212 for generating processing information about the image data, and an authentication section 213 for identifying the user from the user information stored in the IC card and authenticates the user.

The authentication section 213 identifies the user from the user information contained in the IC card 6 and authenticates the user. The authentication section 213 determines whether or not the user is a registered user by comparing the user information read by the IC card I/F 24 with a user list stored beforehand in the storage section 23. If the user can be identified as a registered user, the authentication section 213 permits the user to use the printer 2 and informs the processing information generation section 212 of the permission. If the user cannot be identified, that is, if the user is not a registered user, the authentication section 213 prohibits the user from using the printer 2.

The extraction section 211 determines whether the feature information registered in the data table 231, such as a text string, picture, drawing, or photograph, is contained in the image data to be processed. If a text string, picture, drawing, photograph, or the like that matches the registered feature information is present, the extraction section 211 extracts the matching text string, picture, drawing, photograph, or the like and transmits it to the processing information generation section 212. If a matching text string, picture, drawing, photograph, or the like is absent, the extraction section 211 informs the processing information generation section 212 of the absence.

The extraction section 211 determines whether expiration date information is present for the image data. Specifically, from expiration date information registered beforehand, the extraction section 211 determines whether an expiration date is set for a certain processed image. If an expiration date is set, the extraction section 211 determines whether or not the expiration date has passed and informs the processing information generation section 212 of the determination result. If the expiration date information is absent for the image data, the extraction section 211 informs the processing information generation section 212 of the absence.

The processing information generation section 212 generates processing information about the processed image data. Here, the processing information is information about the image data processed using the printer 2. Specifically, it includes user information about the user who has used the printer 2, feature information contained in the image data, area information about the managed area A or B where the printer is placed, mode information about the processing mode in which the image data has been processed, and expiration date information about the limit until when the image data must be kept confidential.

The feature information is a text string, picture, drawing, or the like that can identify the image data, such as "Department Confidential" or "Company Confidential" contained in the image data. The area information is information about the area where the image processing apparatus is placed. The mode information is information about the user-selected mode such as the copy mode, print mode, scanner mode, facsimile mode, document filing mode, or data transmission mode, and processing conditions in that mode. The expiration date information is the limit until when the image data must be kept confidential.

The processing information generation section 212 generates the processing information by combining the user information, feature information, area information, mode information, and expiration date information obtained from the extraction section 211, authentication section 213, processing section 22, and storage section 23, and transmits the processing information to the IC card I/F 24. The IC card I/F 24, having a function of a writing section, writes the processing information onto the IC card 6.

Figure 2:
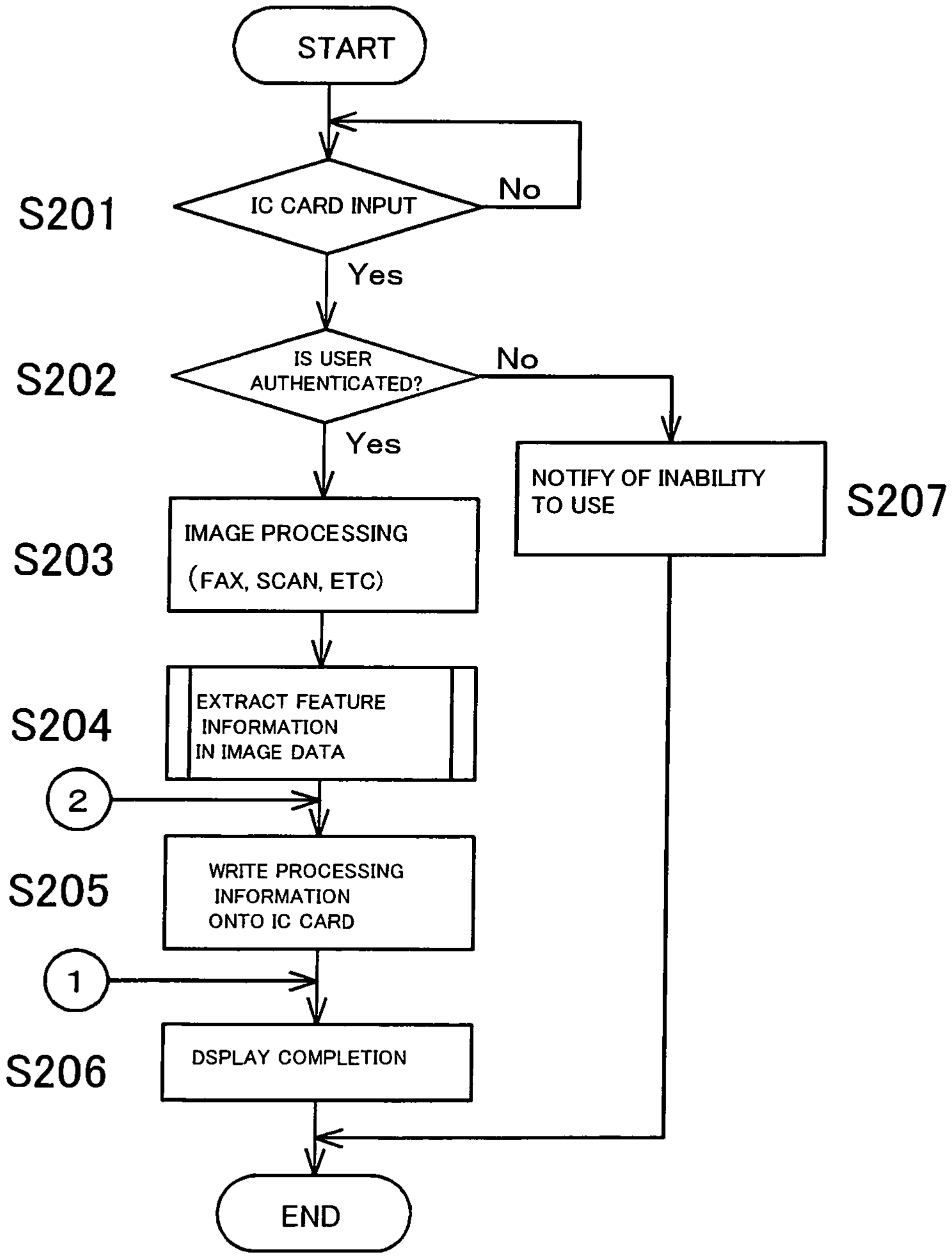
FIG. 2 is a diagram showing a flowchart of an operational process of a printer.
Figure 3:
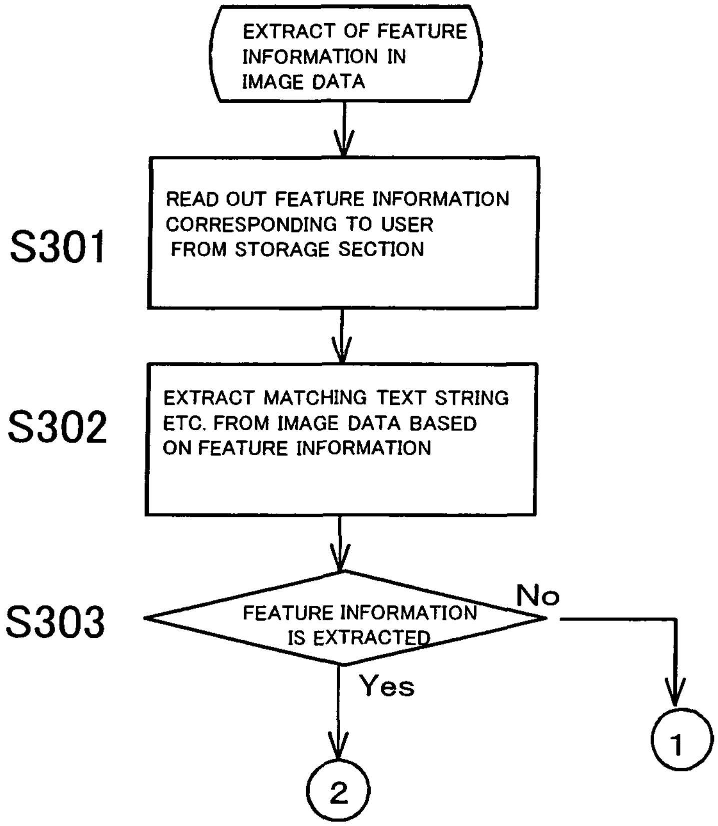
FIG. 3 is a diagram showing a flowchart of an operational process for identifying feature information from image data.

Now, operation of the printer 2 will be described with reference to FIGS. 2 and 3.

When the user holds the IC card 6 over the IC card I/F 24 provided in the printer 2 (S201), the IC card I/F 24 reads the user information from the IC card 6. The authentication section 213 identifies the user from the read user information and authenticates the user (S202). If the identification of the user fails, the authentication section 213 transmits the failure to the manager's PC 5 and notifies the user of the inability to use (S207), and the processing terminates.

If the user is authenticated by the authentication section 213, the control section 21 transmits the authenticated user information to the processing information generation section 212. According to instruction inputs from the user, the control section 21 controls driving of each section based on the program stored in the storage section 23 and processes the image data (S203). At this point, the control section 21 transmits the mode information about the processing selected by the user to the processing information generation section 212.

The extraction section 211 determines whether the feature information is contained in the image data when the image data is processed (S204). Specifically, the extraction section 211 reads out the feature information stored in the storage section 23 (S301). Based on the read feature information, the extraction section 211 determines whether a text string, picture, drawing, photograph, or the like that matches the read feature information is present in the image data to be processed. If a matching text string, picture, drawing, photograph, or the like is not contained in the image data, the extraction section 211 informs the processing information generation section 212 of the absence of the feature information (S303). The processing selected by the user is then continued.

If a matching text string, picture, drawing, photograph, or the like is contained in the image data, the extraction section 211 extracts the recognized text string, picture, drawing, photograph, or the like (S302) and transmits the extracted text string, picture, drawing, photograph, or the like to the processing information generation section 212 (S303). The processing selected by the user is then continued.

The processing information generation section 212 generates the processing information that includes the received user information, mode information, and feature information. The control section 21 instructs to write the generated processing information onto the IC card 6 through the IC card I/F 24 (S205) and displays completion of the operation (S206). The write instruction from the control section 21 is issued only if a picture, text string, or the like that matches the feature information has been extracted by the extraction section 211.

The gates 3 and 4 are provided at the doorway of the managed areas A and B, respectively. Each of the gates 3 and 4 includes a door that physically blocks the user's entrance or exit, a control section 32 or 42 serving as a management section that controls the opening and closing of the door, and a network I/F to which the network is connected.

The control sections 32 and 42 control the opening and closing of the door under an instruction from the management server 1. For example, the control sections 32 and 42 open the door if the management server 1 permits the user's exit, and prohibit opening of the door if the management server 1 prohibits the user's exit.

The gates 3 and 4 includes IC card I/Fs 31 and 41 respectively, serving as a reading section that reads the processing information from the IC card 6. The IC card I/Fs 31 and 41 are placed at the inside and outside of the managed areas A and B respectively, and the IC card I/Fs 31 and 41 are placed near the doors. The IC card I/Fs 31 and 41 are IC card readers for performing contactless data communication with the IC card 6.

The IC card I/Fs 31 and 41 also have a function of detecting the user's entrance to or exit from the managed areas. Specifically, when the user holds the IC card 6 over the IC card I/F 31 or 41 while going to enter or exit the managed area A or B, the IC card I/F 31 or 41 receives the user information from the IC card 6. Thus, the IC card I/F 31 or 41 detects that the user is going to pass through the gate 3 or 4. The IC card I/F 31 or 41 transmits the fact that the user information has been received to the management server 1 along with the read processing information.

When the user is going to exit the managed area A or B, the management server 1 determines whether the user's exit from the managed area A or B is permitted or prohibited. Specifically, the management server 1 includes: a control section 11 having a determination function for determining whether or not the user's exit is permitted by referring to the user information and the processing information stored in the IC card 6; a storage section 12 storing data tables 121 in which reference information to be compared with the processing information is registered; and the network I/F 13 to which the network is connected.

The storage section 12 stores the data tables 121 beforehand in which the reference information as shown in FIGS. 4 to 6 is registered. The data tables 121 include a table as shown in FIG. 4 in which the feature information such as a text string, picture, drawing, or photograph is registered for each user, a table as shown in FIG. 5 in which information indicating whether or not the managed area A or B entered by each user is available for the user, and a table as shown in FIG. 6 in which the feature information such as a text string, picture, drawing, or photograph is registered for each managed area. Besides these tables, there are data tables in which information such as the user information about registered users, the expiration date information about image data, and the area information about each managed area are registered.

The reference information is criteria for determining whether or not the user is permitted to exit each managed area, and different information is set for different managed area.

The control section 11 includes an authentication section 111 for identifying the user who is going to exit, a determination section 112 for determining whether the user's exit is permitted or prohibited, a registration section 113 for storing information in the storage section 12, and a notification section 114 for notifying the manager's PC 5 and the user of the determination when it is determined that the user's exit is prohibited.

The authentication section 111 identifies the user from the user information contained in the IC card 6. Specifically, the authentication section 111 identifies the user by comparing the user information with a user list stored beforehand in the storage section 12 and extracting a matching user. If a matching user cannot be extracted, the user is identified as an unregistered user and prohibited from entering the managed area A or B.

The determination section 112 determines whether or not the user is permitted to exit the managed area A or B. Specifically, the determination section 112 first reads the processing information from the IC card 6. The authentication section 111 identifies the user from the user information included in the read processing information. The determination section 112 then determines whether the identified user is permitted to exit the managed area A or B by comparing the processing information with the data tables 121 shown in FIGS. 4 to 6.

For example, when a user "001" is going to exit from the managed area A, the authentication section 111 determines whether or not the user is a registered user. Once the user is authenticated, the determination section 112 refers to the data table 121 in FIG. 4 in which the feature information is registered for each user. The determination section 112 determines whether a text string, picture, drawing, photograph, or the like representing "Company Confidential", "x○○ Meeting Report", or "○xx.jpg" is included in the processing information for the user "001". If it is included, the determination section 112 determines that the user's exit is prohibited.

If it is not included, the determination section 112 refers to the data table 121 in FIG. 6 in which the feature information is registered for each managed area. The determination section 112 determines whether a text string representing "Company Confidential" or "Department Confidential" is included in the processing information for the user "001". If it is included, the determination section 112 determines that the user's exit is prohibited.

If it is not included, the determination section 112 refers to the data table 121 shown in FIG. 5 in which available managed areas are registered for each user. The determination section 112 determines whether or not the user "001" is authorized to use the managed area A or B that the user is going to exit. If it is determined that the user is unauthorized, the determination section 112 determines that the user's exit is prohibited. If it is determined that the user is authorized, the determination section 112 determines that the user's exit is permitted. The determination result is transmitted to the control section 32 or 42 of the gate 3 or 4, and the control section 32 or 42 controls the opening and closing of the door based on the determination result.

The registration section 113 registers various kinds of information in the data tables 121 in the storage section 12 under instructions from the manager. Specifically, the registration section 113 registers feature information added or deleted by the manager through the manager's PC 5. The registration section 113 also modifies the registered content of each data table 121. At this point, the expiration date for the feature information is registered. Thus, for example, if the expiration date has not passed, it is determined that the image data including that feature information needs to be kept confidential, so that the image data cannot be carried outside. If the expiration date has passed, it is determined that the image data including that feature information does not need to be kept confidential, so that the image data can be carried outside.

Figure 9:
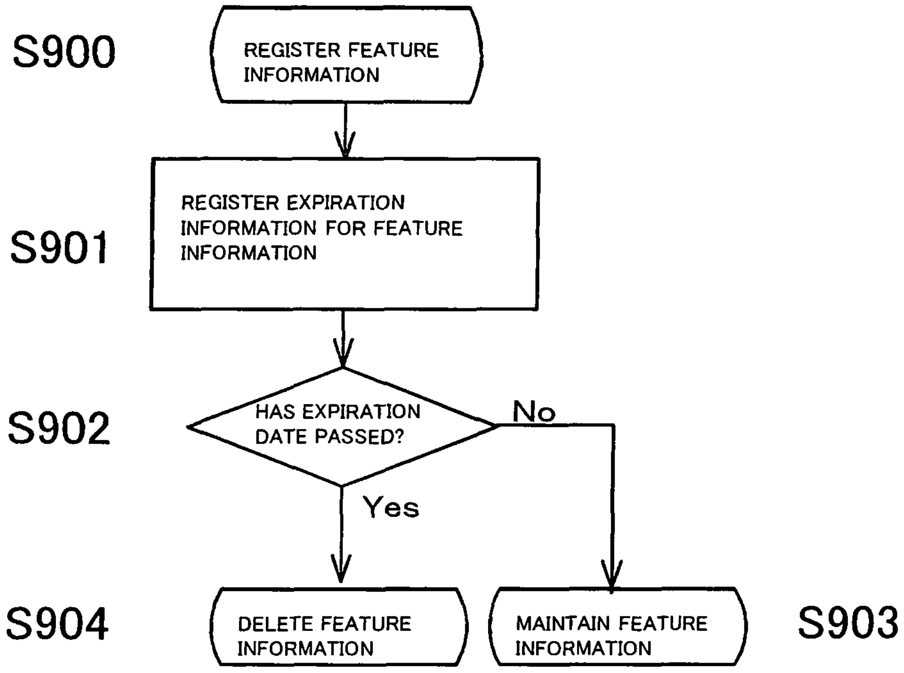
FIG. 9 is a diagram showing a flowchart in the case where expiration date information for the feature information is checked.

As shown in FIG. 9, to register the feature information by the registration section 113, the feature information about the image data is entered and registered under a user's instruction (S900). The expiration date for the registered feature information is set (S901).

It is then determined whether the expiration date for the registered feature information has passed (S902). Specifically, it is determined whether an expiration date is included in the feature information. If an expiration date is included in the feature information, it is determined whether or not the expiration date has passed. If the expiration date has passed, it is determined that the feature information is not valid, and the feature information is deleted (S904). If the expiration date has not passed, it is determined that the feature information is valid, and the feature information is maintained. The process terminates when the determination is made for all feature information items.

When the determination section 112 determines that the user's entry or exit is prohibited, the notification section 114 transmits the determination result to the manager's PC 5.

Figure 7:
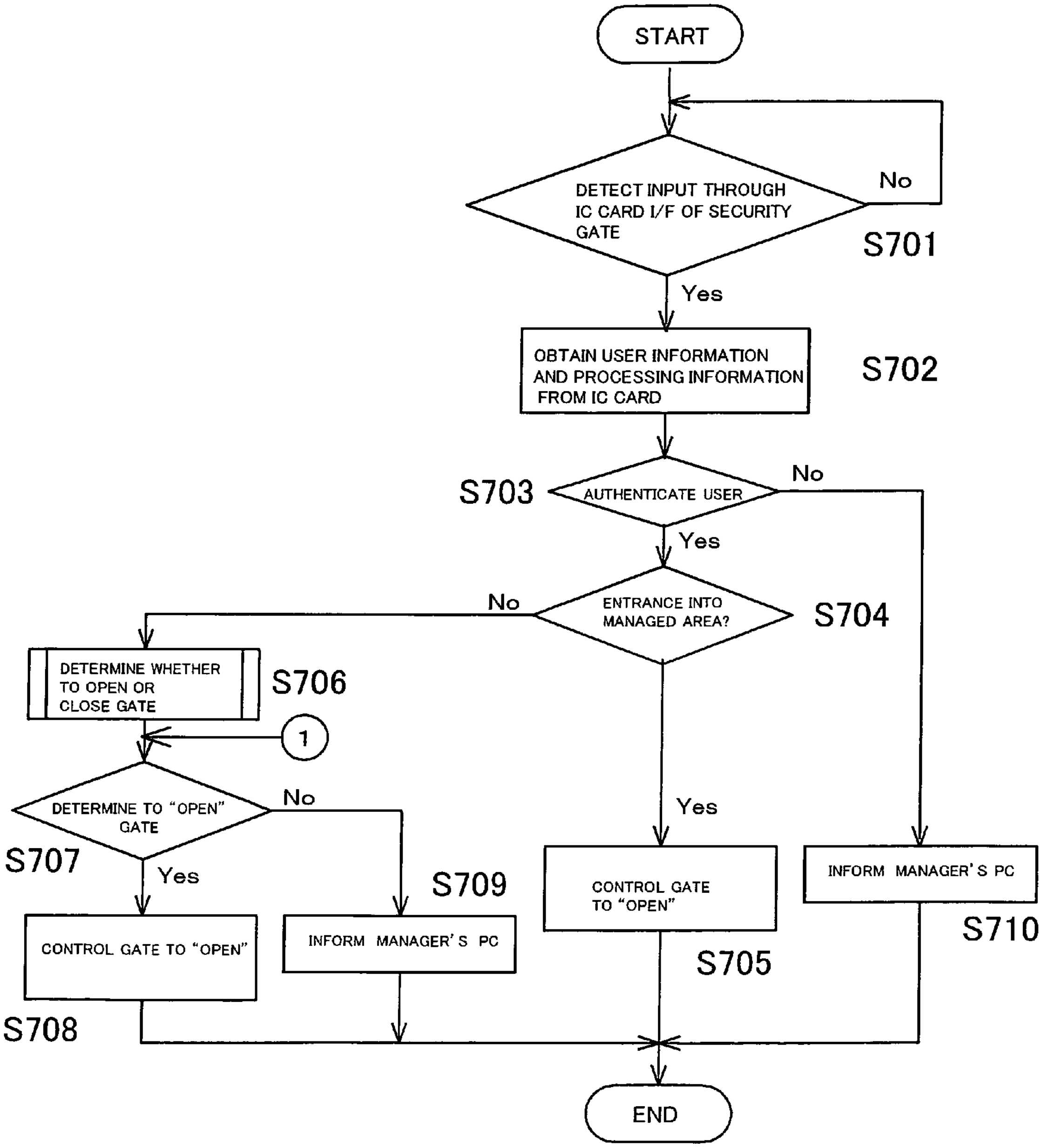
FIG. 7 is a diagram showing a flowchart of an operational process of a management server.
Figure 8:
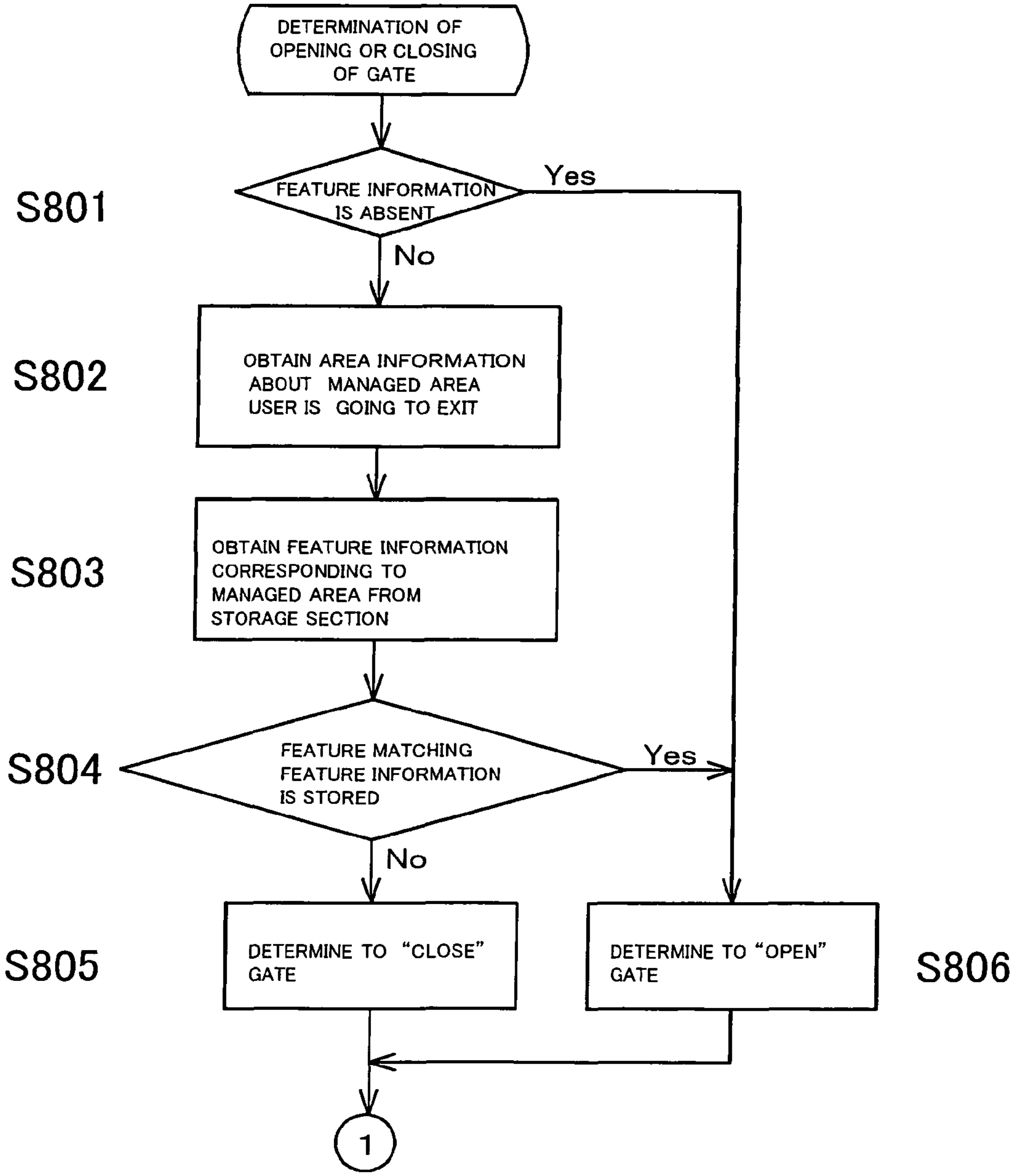
FIG. 8 is a diagram showing a flowchart of a process of determining whether or not to permit exit.

Now, the operational process of the image data management system in this embodiment will be described with reference to FIGS. 7 and 8. Here, for convenience of description, determination as to whether the user's exit from the managed area A is permitted or prohibited will be described as an example. The data table shown in FIG. 6 is used as the data table 121 to be referred to in determining whether the user's exit is permitted or prohibited.

When the user holds the IC card 6 over the IC card I/F 31 of the gate 3 provided in the managed area A (S701), the IC card I/F 31 reads the user information from the IC card 6 (S702). The control section 32 of the gate 3 transmits the read user information to the management server 1. The management server 1 identifies the user from the received user information (S703). If the identification of the user fails, the management server 1 transmits the failure to the manager's PC 5 and instructs the control section 32 of the gate 3 to prohibit the user's entry (S710). The control section 32 prohibits opening of the door under the received instruction, and the processing terminates.

Once the user is authenticated by the authentication section 111 of the management server 1, the control section 11 determines whether the user is going to enter or exit the managed area A based on the location of the IC card I/F 31 that has read the user information from the IC card 6, that is, based on whether the IC card I/F 31 is placed outside or inside the managed area (S704).

If the IC card I/F 31 is placed outside the managed area A, it is determined that the user is going to enter the managed area A. The control section 11 instructs to open the door. The control section 32 of the gate 3 opens the door under the instruction (S705).

The user enters the managed area A and uses the printer 2 placed within the managed area A to process image data. The printer 2 then generates the processing information, which is written to the user's IC card.

If the IC card I/F 31 is placed inside the managed area A, it is determined that the user is going to exit the managed area A. The control section 11 determines whether the user's exit is permitted or prohibited (S706). The control section 11 determines whether the feature information is included in the processing information (S801). If the feature information is not included, the control section 11 determines that the user's exit is permitted and instructs to open the gate. The gate 3 opens the door under the instruction (S806).

If it is determined that the feature information is included in the processing information, the control section 11 determines the managed area that the user is going to exit (S802). The control section 11 reads out the feature information corresponding to the managed area A from the data table 121 shown in FIG. 6 (S803). The control section 11 determines whether the read-out feature information is included in the processing information (S804). If it is determined that the read-out feature information is not included, it is determined that the user's exit is permitted (S806), and the gate 3 opens the door (S708). If it is determined that the read-out feature information is included, it is determined that the user's exit is prohibited, and the gate 3 prohibits opening of the door (S805). The control section 11 informs the manager's PC 5 of the prohibition (S709).

Thus, when image data is processed in the printer 2 within the managed area A or B, the processing information about the processed image data is stored in the IC card 6. Therefore, the management server 1 can know the user's state of use based on the processing information in the IC card 6 and can control the opening and closing of the gate 3 or 4 depending on the state of use. If the image data is a confidential document, carrying the confidential document outside the managed area A or B can be restrained.

Second Embodiment

Figure 10:
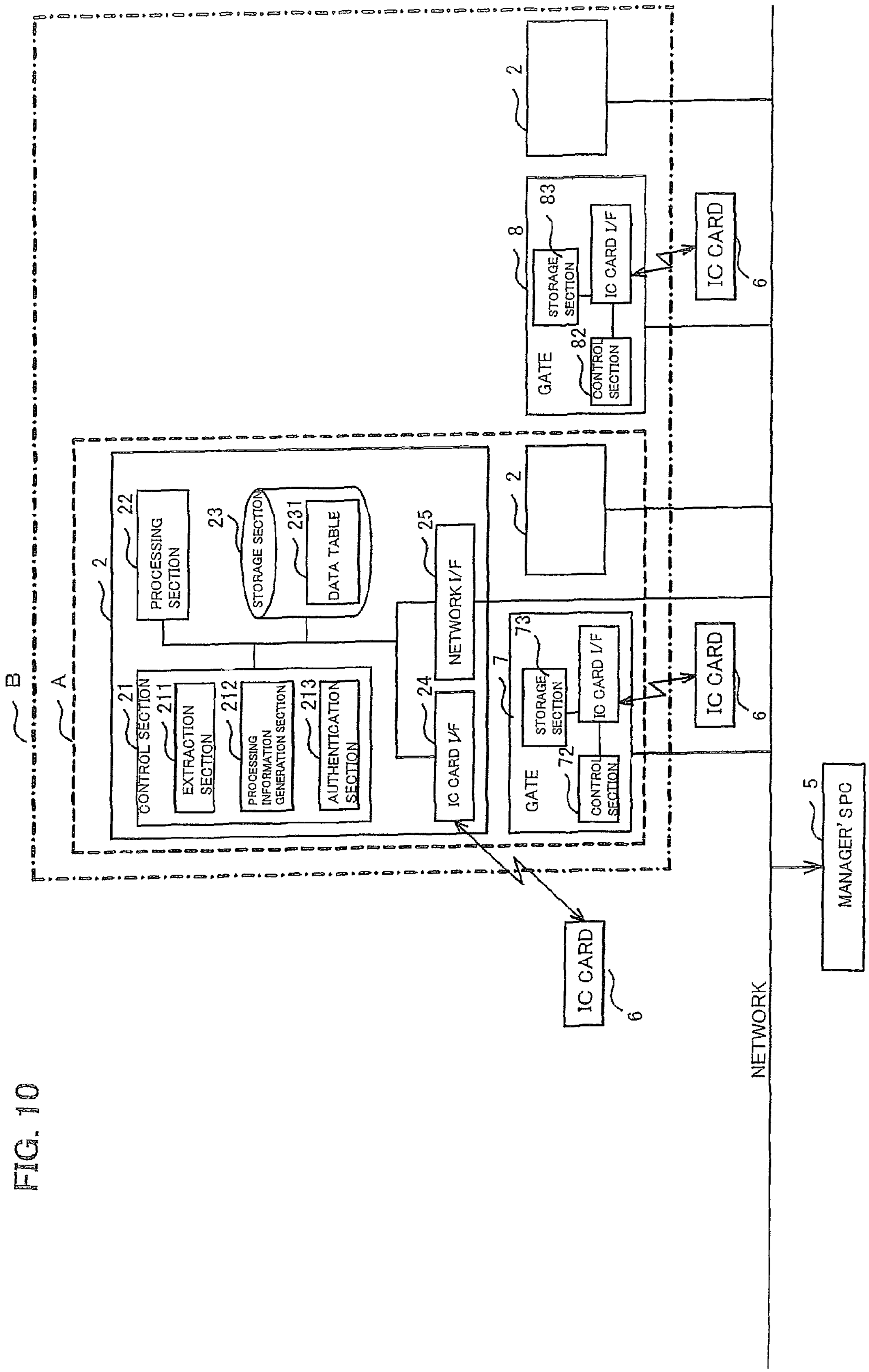
FIG. 10 is a block diagram of the image data management system according to a second embodiment.

Now, a second embodiment of the present invention will be described with reference to FIG. 10. Like elements as in the first embodiment are labeled with like symbols and will not be described, and only different elements will be described. For convenience of description, determination as to whether the user's exit from the managed area A is permitted or prohibited will be described as an example. Determination as to whether the user's exit from the managed area B is permitted or prohibited is made in a similar manner as in the case of the managed area A.

In the second embodiment, the management server 1 is not provided. A gate 7 serves as the monitoring apparatus. That is, a control section 72 of the gate 7 determines whether the user's exit is permitted or prohibited when the user is going to exit the managed area A. For this purpose, the gate 7 includes a storage section 73. The storage section 73 stores the data tables that have been stored in the storage section 12 of the management server 1 in the first embodiment.

For example, when the user holds the IC card 6 over the IC card I/F 31 of the gate 7, the control section 72 detects that the user is going to exit the managed area A. From the processing information stored in the IC card 6 and the data tables stored in the storage section 73, the control section 72 determines whether or not the user's exit is permitted. The control section 72 controls the opening and closing of the door based on the determination result.

Thus, once the processing information stored in the IC card 6 is read by the IC card I/F 71, the determination as to whether or not the user's exit is permitted completes at the gate 7 without access to the management server 1. This allows shortening of the communication time required for communicating with the management server. In addition, this embodiment can reduce the cost because the management server 1 is not required.

Third Embodiment

Now, a third embodiment of the present invention will be described with reference to FIG. 1. Like elements as in the first embodiment are labeled with like symbols and will not be described, and only different elements will be described. For convenience of description, determination as to whether the user's exit from the managed area A is permitted or prohibited will be described as an example. Determination as to whether the user's exit from the managed area B is permitted or prohibited is made in a similar manner as in the case of the managed area A.

The third embodiment has the same configuration as the first embodiment. The third embodiment is different from the first embodiment in that the management server 1 also serves as the storage apparatus. That is, the management server 1 has a function of storing the processing information that has been stored in the IC card 6 in the first embodiment.

For example, the IC card 6 contains the user information identifying the user. The printer 2 identifies the user who uses the printer 2 from the user information in the IC card 6. When the user uses the printer 2, the processing information generation section 212 of the printer 2 generates the processing information and transmits the processing information to the storage section 12 of the management server 1 over the network.

When the user is going to exit the managed area A, the user holds the IC card 6 over the IC card I/F 31 of the gate 3. The control section 11 of the management server 1 checks the processing information stored in the storage section 12 based on the user information, and determines whether or not the user's exit is permitted. The control section 92 controls the opening and closing of the door based on the determination result.

Thus, since the processing information about the image data processing is not stored in the IC card 6 but stored in the management server 1, tampering with the processing information can be prevented. In addition, this embodiment can reduce the cost because the capacity of memory or the like provided in the IC card 6 can be reduced.

Fourth Embodiment

Now, a fourth embodiment of the present invention will be described with reference to FIG. 10. Like elements as in the first embodiment are labeled with like symbols and will not be described, and only different elements will be described. For convenience of description, determination as to whether the user's exit from the managed area A is permitted or prohibited will be described as an example. Determination as to whether the user's exit from the managed area B is permitted or prohibited is made in a similar manner as in the case of the managed area A.

The fourth embodiment has the same configuration as the second embodiment. The fourth embodiment is different from the second embodiment in that the gate 7 serves as the monitoring apparatus and also as the storage apparatus. That is, the control section 72 of the gate 7 has all functions of the control section 11 that have been provided in the management server 1 in the first embodiment. The gate 7 also stores the processing information that has been stored in the IC card 6 in the second embodiment.

Specifically, the gate 7 includes the storage section 73. The storage section 73 stores the data tables that have been stored in the storage section 12 of the management server 1 in the first embodiment. The storage section 73 also stores the processing information that is output from the printer 2.

For example, the IC card 6 contains the user information identifying the user. The printer 2 identifies the user who uses the printer 2 from the user information in the IC card 6. When the user uses the printer 2, the processing information generation section 212 of the printer 2 generates the processing information and transmits the processing information to the storage section 73 of the gate 7 over the network.

When the user is going to exit the managed area A, the user holds the IC card 6 over the IC card I/F 71 of the gate 7. The control section 72 of the gate 7 checks the processing information stored in the storage section 73 based on the user information, and determines whether or not the user's exit is permitted. The control section 72 controls the opening and closing of the door based on the determination result.

Thus, since the processing information is not stored in the IC card 6 but stored in the storage section 73 of the gate 7, tampering with the processing information can be prevented. Further, once the information stored in the IC card 6 is read by the IC card I/F 71, processing completes within the gate 7 without access to the management server 1. This allows elimination of the communication time. In addition, this embodiment can reduce the cost because the management server 1 is not required. Further, this embodiment can reduce the cost because the capacity of memory or the like provided in the IC card 6 can be reduced.

It is to be understood that the present invention is not limited to the above-described embodiments but many modifications and alterations may be made to the above-described embodiments within the scope of the present invention. The monitoring apparatus in the present invention has a detection function for detecting that the user is going to exit the managed area, a determination function for determining whether or not the detected user's exit is permitted, a storage function for storing data for comparison in the determination, and a gate control function for controlling the gate based on the determination result. However, this is not a limitation. For example, the monitoring apparatus may have only a function of determining whether or not the user's exit is permitted. In this case, for the detection of the user's exit, the data for comparison, and the control of opening and closing the gate, the monitoring apparatus needs to have data transmitted from apparatuses having relevant functions.

Although whether or not the user is going to exit the managed area is detected by communication with the IC card, it may be determined based on whether or not the user is approaching the gate by using a camera, infrared sensor, or the like. Alternatively, whether or not the user is going to exit may be determined based on the user's movement within the managed area by using a GPS function.

Although the structure of the managed areas is described as a double structure of the inner and outer managed areas, it may be a multiple structure such as a triple or quadruple structure. It may also be a structure in which a plurality of inner managed areas are included in one outer area.

Although the monitoring apparatus determines whether the user's exit from the managed area is permitted or prohibited based on the user information, feature information, area information, and mode information that are the processing information, the determination may be made based on any one of these information items or all of these information items.

Although the expiration date information is set for the image data or the feature information, it may be set for all information items including the user information and the area information. For example, the expiration date information may be set for the user information if some of the users are temporary workers such as part-time workers and dispatched workers. These workers cannot use the image data after a certain period has passed.

Although the IC card is used to identify the user, biometric identification may also be used. In this case, the processing information needs to be output to the storage section of the management server or to the storage section of the gate.

What is claimed is:

1. An image data management system comprising:

a monitoring apparatus for monitoring a user's exit from a managed area;

a storage apparatus for storing processing information;

an image processing apparatus provided in the managed area, the image processing apparatus for creating processing information about processed image data and for outputting the processing information to the storage apparatus when the user uses the image processing apparatus to process any of a copy mode, print mode, scanner mode, facsimile mode, document filing mode and data transmission mode for the image data; and a management server connected with the monitoring apparatus and the image processing apparatus over a network, wherein the management server is the storage apparatus, the image processing apparatus writes the processing information into the management server, and the monitoring apparatus obtains the processing information from the management server when the user is going to exit the managed area, wherein the monitoring apparatus knows the state of use indicating what kind of processing has been performed by the user, who has used the image processing apparatus, for what kind of image data based on the processing information in the storage apparatus, and determines whether the user's exit from the managed area is permitted or prohibited depending on the state of use.

2. The image data management system according to claim 1, wherein the processing information includes user information identifying the user, and the monitoring apparatus determines whether or not the user can use the image processing apparatus from the user information, and permits the user's exit if it is determined that the user can use the image processing apparatus, and prohibits the user's exit if it is determined that the user cannot use the image processing apparatus.

3. The image data management system according to claim 1, wherein the processing information includes feature information representing a feature of the processed image data, and the monitoring apparatus determines whether or not the image data is confidential from the feature information, and permits the user's exit if it is determined that the image data is not confidential, and prohibits the user's exit if it is determined that the image data is confidential.

4. The image data management system according to claim 1, wherein the processing information includes expiration date information indicating a period for which the processed image data is kept confidential, and the monitoring apparatus determines whether or not the expiration date has passed, and permits the user's exit if it is determined that the expiration date has passed, and prohibits the user's exit if it is determined that the expiration date has not passed.

5. The image data management system according to claim 1, wherein the processing information includes area information about the managed area, and the monitoring apparatus determines whether or not the processed image data can be carried outside based on the area information, and permits the user's exit if it is determined that the image data can be carried outside, and prohibits the user's exit if it is determined that the image data cannot be carried outside.

6. The image data management system according to claim 1, wherein the processing information includes mode information about processing performed with respect to the image data, and the monitoring apparatus determines whether or not the use of the mode is authorized from the mode information, and permits the user's exit if it is determined that the use is authorized, and prohibits the user's exit if it is determined that the use is unauthorized.

7. The image data management system according to claim 1, wherein the management server functions as the monitoring apparatus, the management server comprises a management section for controlling opening and closing of a gate provided at a doorway of the managed area, and the management section determines whether or not the gate can be opened or closed based on the processing information upon detecting the user going to exit the managed area.

8. The image data management system according to claim 1, wherein the monitoring apparatus comprises a management section for controlling opening and closing of a gate provided at a doorway of the managed area, and upon detecting the user going to exit the managed area, the management section obtains the processing information from the management server and determines whether or not the gate can be opened or closed.

9. The image data management system according to claim 1, comprising a plurality of managed areas, wherein the plurality of managed areas form a multiple structure in which inner managed areas are included in outer managed areas, and the monitoring apparatus determines whether the user's exit from each managed area is permitted or prohibited each time the user is going to exit the managed area.

10. The image data management system according to claim 9, wherein the monitoring apparatus determines whether the exit is permitted or prohibited for each managed area based on reference information that is set for each managed area.

11. The image data management system according to claim 1, wherein the monitoring apparatus notifies a manager when it is determined that the exit is prohibited.

* * * * *